(12) United States Patent
Taguchi

(10) Patent No.: US 9,751,439 B2
(45) Date of Patent: Sep. 5, 2017

(54) VEHICLE SEAT

(71) Applicant: TACHI-S CO., LTD., Tokyo (JP)

(72) Inventor: Masayuki Taguchi, Tokyo (JP)

(73) Assignee: TACHI-S CO., LTD. (JP)

( * ) Notice: Subject to any disclaimer, the term of this patent is extended or adjusted under 35 U.S.C. 154(b) by 111 days.

(21) Appl. No.: 14/407,691

(22) PCT Filed: Jun. 27, 2013

(86) PCT No.: PCT/JP2013/067721
§ 371 (c)(1),
(2) Date: Dec. 12, 2014

(87) PCT Pub. No.: WO2014/003143
PCT Pub. Date: Jan. 3, 2014

(65) Prior Publication Data
US 2015/0165946 A1    Jun. 18, 2015

(30) Foreign Application Priority Data

Jun. 29, 2012   (JP) .................................. 2012-146380

(51) Int. Cl.
*B60N 2/56* (2006.01)
*B60N 2/58* (2006.01)
(Continued)

(52) U.S. Cl.
CPC .............. *B60N 2/5621* (2013.01); *A47C 7/74* (2013.01); *A47C 31/02* (2013.01); *B60N 2/5657* (2013.01);
(Continued)

(58) Field of Classification Search
CPC .. B60N 2/5664; B60N 2/5621; B60N 2/5642; B60N 2/5657; B60N 2/5883; B60N 2/56; A47C 7/746
See application file for complete search history.

(56) References Cited

U.S. PATENT DOCUMENTS 2,208,745 A * 7/1940 Bloomberg ............ A47C 7/185
297/452.25
2,551,819 A * 5/1951 Wing ........................ B62J 1/00
297/452.24
(Continued)

FOREIGN PATENT DOCUMENTS

CN         1937937 A     3/2007
EP       0 443 726 A1    8/1991
(Continued)

OTHER PUBLICATIONS

Office Action dated Jan. 26, 2016 issued in corresponding Japanese patent Application No. 2014-522692 with English translation.
(Continued)

*Primary Examiner* — David R Dunn
*Assistant Examiner* — Tania Abraham
(74) *Attorney, Agent, or Firm* — Ostrolenk Faber LLP

(57) ABSTRACT

A vehicle seat comprising a foam padding having a through-bore, a surface cover element covering a surface of the foam padding, and a functional element formed from a soft material. The functional element has a tubular body fitted in the through-bore of the foam padding and a flange integral with the tubular body. An area of the flange of the functional element, adjacent to a peripheral end of the flange, is sewn with a reverse side of an edge portion of an opening defined in the surface cover element, such reverse side facing to the foam padding. The surface cover element with the flange thus sewn therewith covers the foam padding, with the tubular body being fitted in the through-bore of the foam padding, so that a surface of the flange and an opening of the tubular body are exposed in an outer surface of the vehicle seat.

19 Claims, 9 Drawing Sheets

(51) Int. Cl.
*B60N 2/64* (2006.01)
*B60N 3/10* (2006.01)
*A47C 31/02* (2006.01)
*A47C 7/74* (2006.01)

(52) U.S. Cl.
CPC ............ *B60N 2/5664* (2013.01); *B60N 2/58* (2013.01); *B60N 2/5825* (2013.01); *B60N 2/5875* (2013.01); *B60N 2/5883* (2013.01); *B60N 2/64* (2013.01); *B60N 3/10* (2013.01)

(56) References Cited

U.S. PATENT DOCUMENTS

| | | | | |
|---|---|---|---|---|
| 3,341,251 A * | 9/1967 | Costin | ..................... | A47C 5/12 297/452.59 |
| 3,506,308 A * | 4/1970 | Fenton | ..................... | A47C 4/54 297/452.44 |
| 3,630,570 A * | 12/1971 | Swenson | .................. | A47C 7/66 297/452.46 |
| 4,786,103 A * | 11/1988 | Selbert | ..................... | B60N 2/70 297/452.38 |
| 5,248,356 A * | 9/1993 | Shimada | .................. | B60R 22/22 156/293 |
| 5,275,779 A | 1/1994 | Marfilius et al. | | |
| 5,401,075 A * | 3/1995 | Venuto | ................. | A47C 31/023 297/218.2 |
| 5,928,548 A * | 7/1999 | Johansson | .............. | A47C 7/748 219/217 |
| 6,059,018 A * | 5/2000 | Yoshinori | .......... | B60H 1/00285 165/41 |
| 6,581,225 B1 * | 6/2003 | Imai | ....................... | A61G 7/057 5/421 |
| 6,637,822 B1 | 10/2003 | Kato | | |
| 7,322,643 B2 * | 1/2008 | Ishima | ................. | B60N 2/5621 297/180.1 |
| 7,478,869 B2 * | 1/2009 | Lazanja | ............... | B60N 2/5635 297/180.13 |
| 7,607,739 B2 * | 10/2009 | Browne | ............... | B60N 2/5621 297/180.1 |
| 7,827,805 B2 * | 11/2010 | Comiskey | ........... | B60N 2/5635 62/244 |
| 7,862,113 B2 * | 1/2011 | Knoll | ................... | B60N 2/5635 297/180.13 |
| 2005/0285438 A1 | 12/2005 | Ishima et al. | | |

FOREIGN PATENT DOCUMENTS

| | | |
|---|---|---|
| JP | 2003-125892 | 5/2003 |
| JP | 2007-118757 | 5/2007 |
| JP | 2010-064636 A | 3/2010 |
| JP | 2011-156993 A | 8/2011 |
| JP | 2012-201321 | 2/2012 |
| JP | 2012-020668 | 10/2012 |

OTHER PUBLICATIONS

Extended European Search Report, dated Sep. 4, 2015, issued in corresponding European Application No. EP13808999.0. Total 7 pages.
International Search Report dated Sep. 24, 2013 issued in corresponding International patent application No. PCT/JP2013/067721.
First Office Action dated Mar. 1, 2016 in corresponding Chinese Patent Application No. 201380030471.0 (with English language translation)(total 7 pages).
Second Office Action (PCT Application) dated Jul. 27, 2016 in corresponding Chinese Patent Application No. 201380030471.0 (with English language translation)(total 9 pages).

* cited by examiner

[FIG. 1]
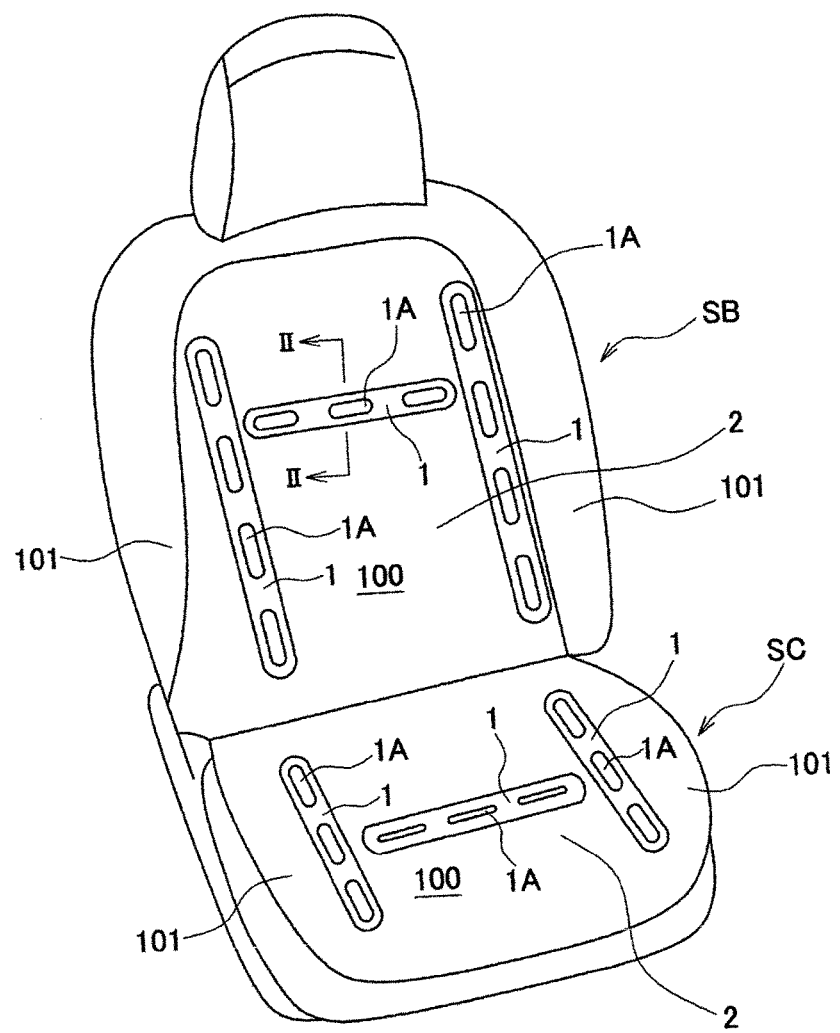

[FIG. 2]
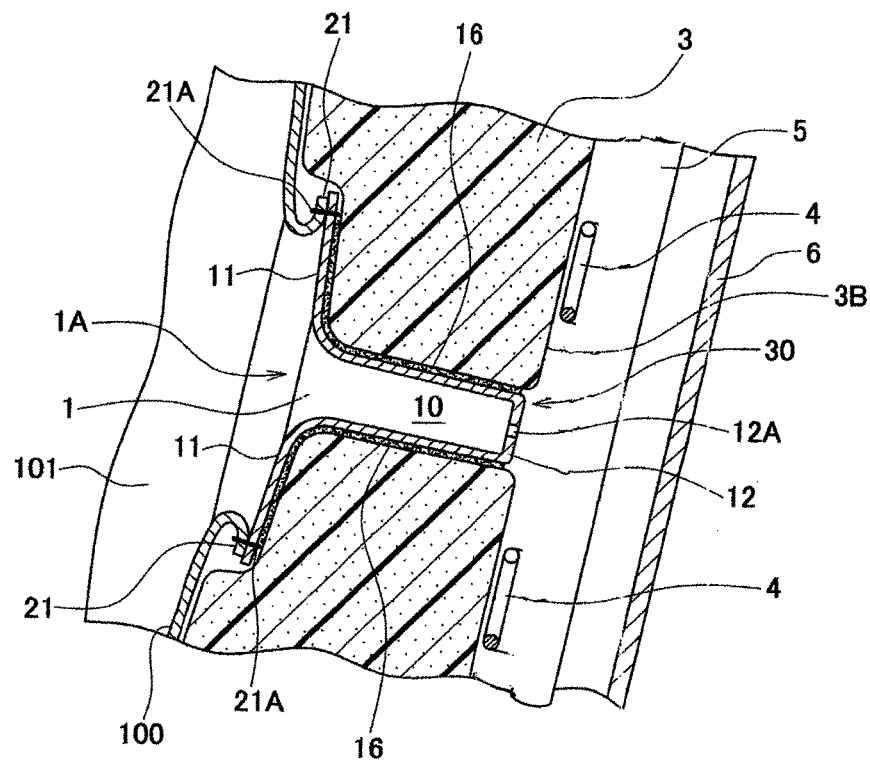
[FIG. 3]
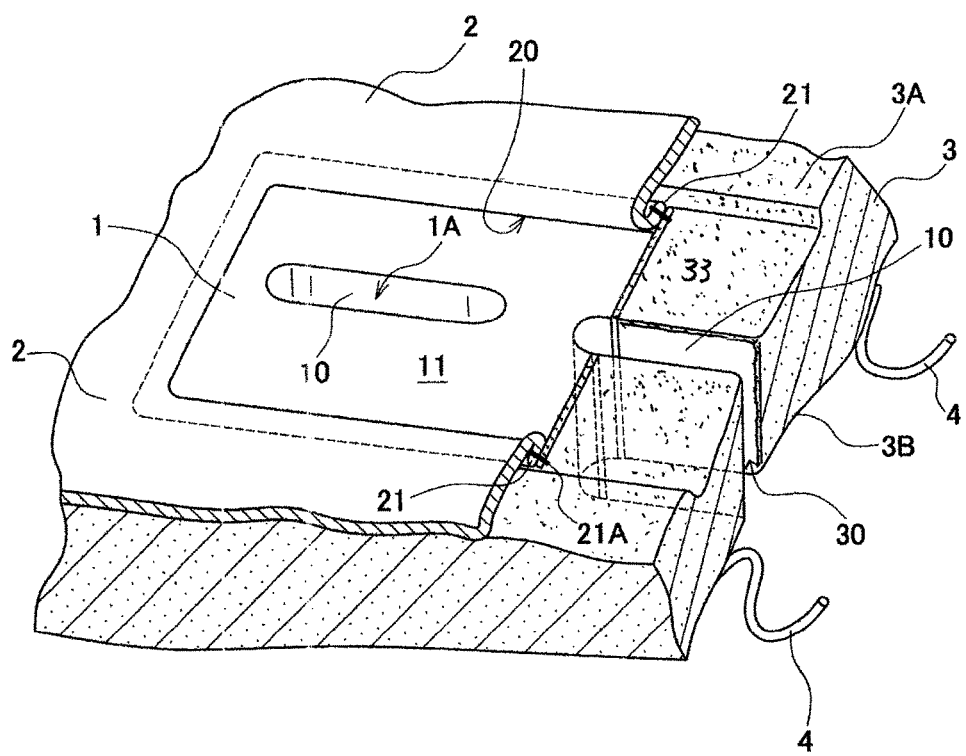

[FIG. 4]
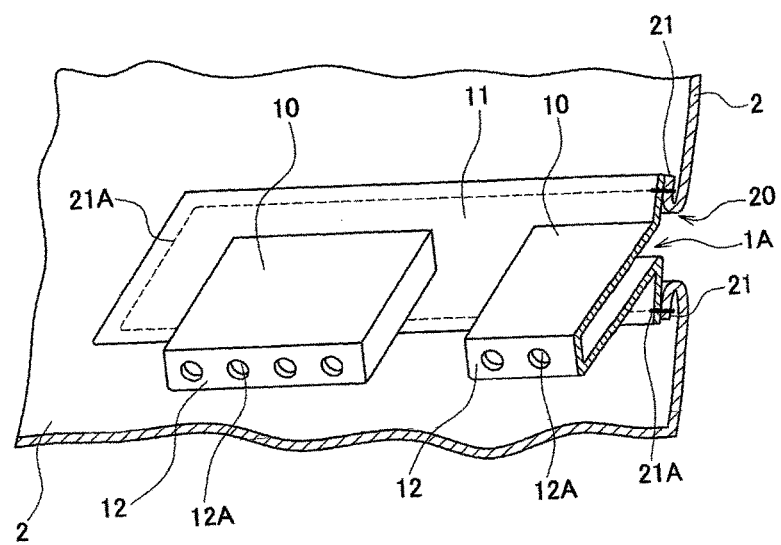

[FIG. 5]
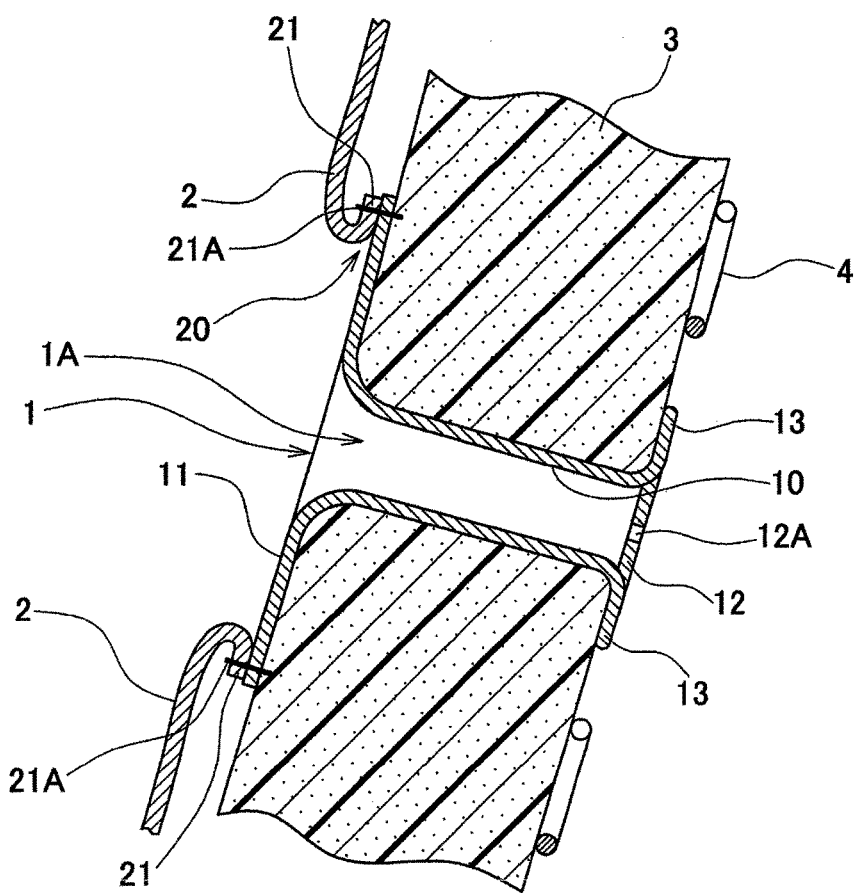

[FIG. 6]
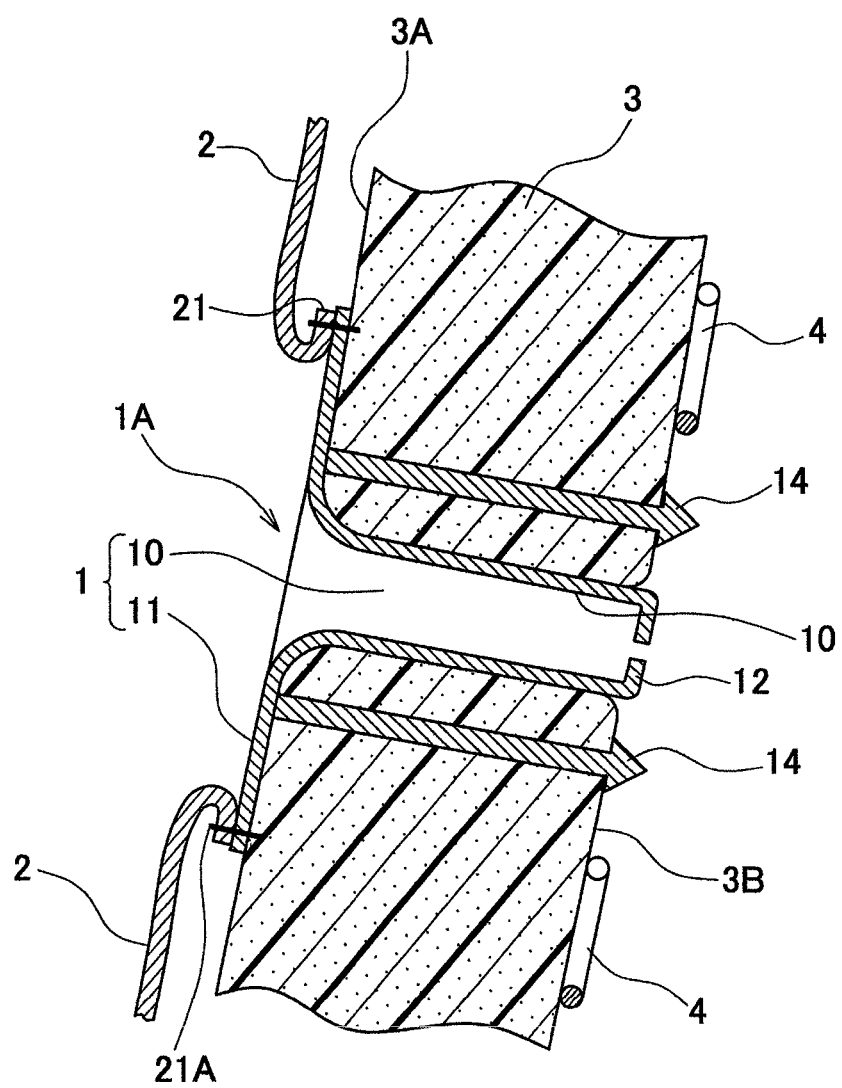

[FIG. 7]
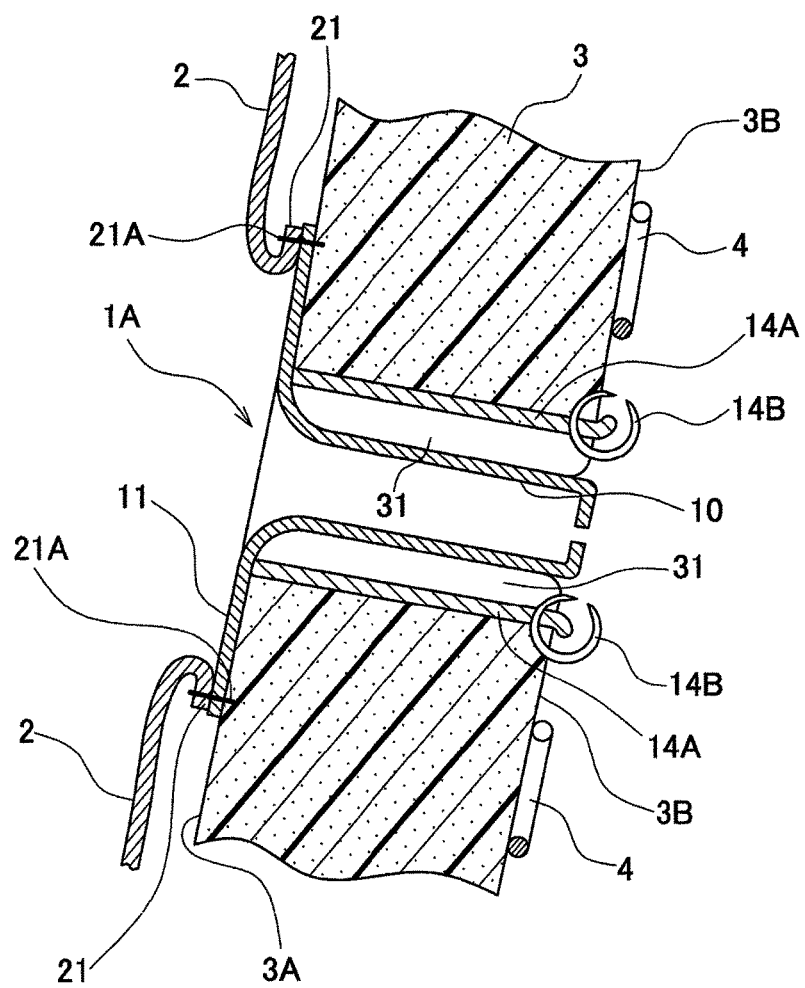

[FIG. 8]
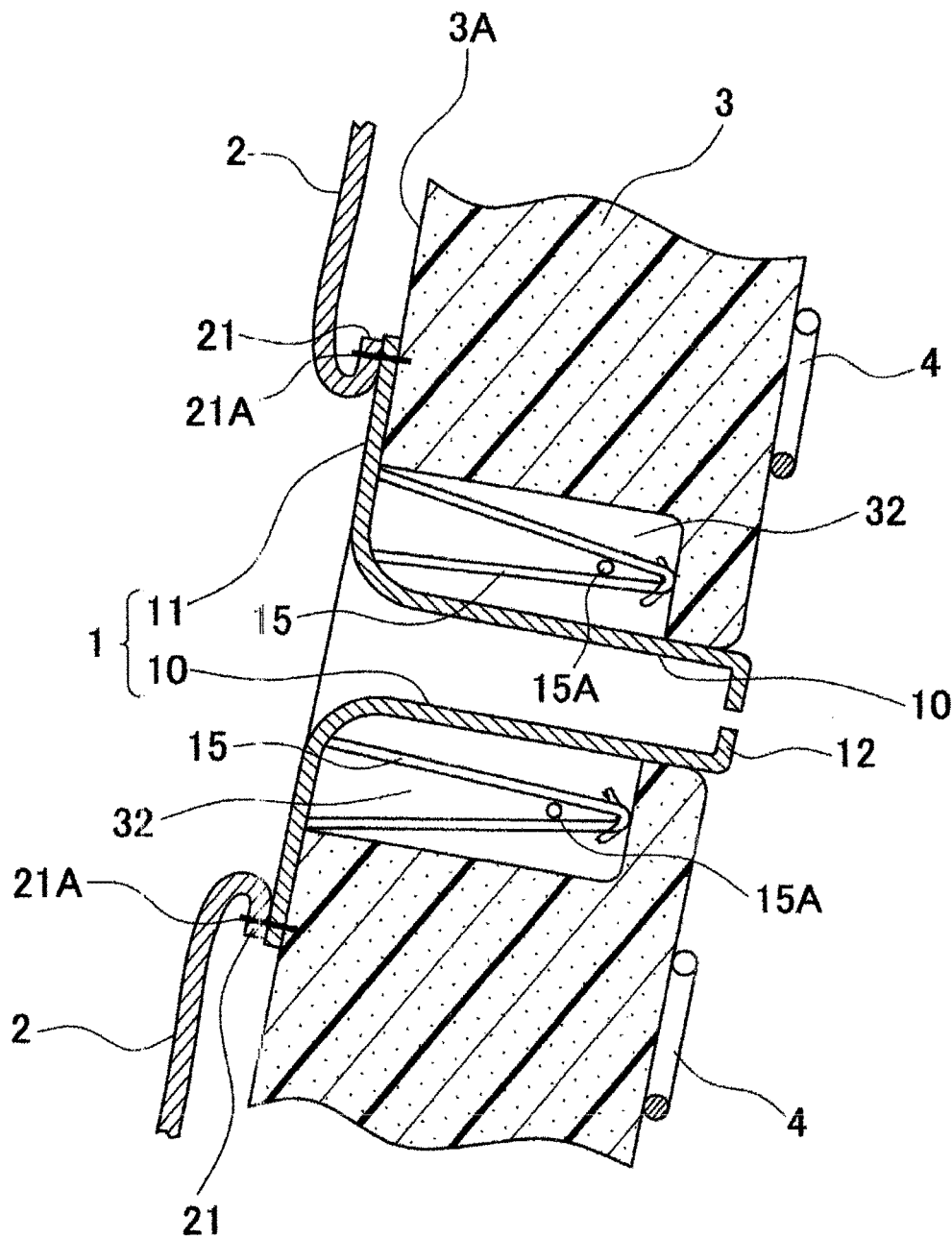

[FIG. 9]
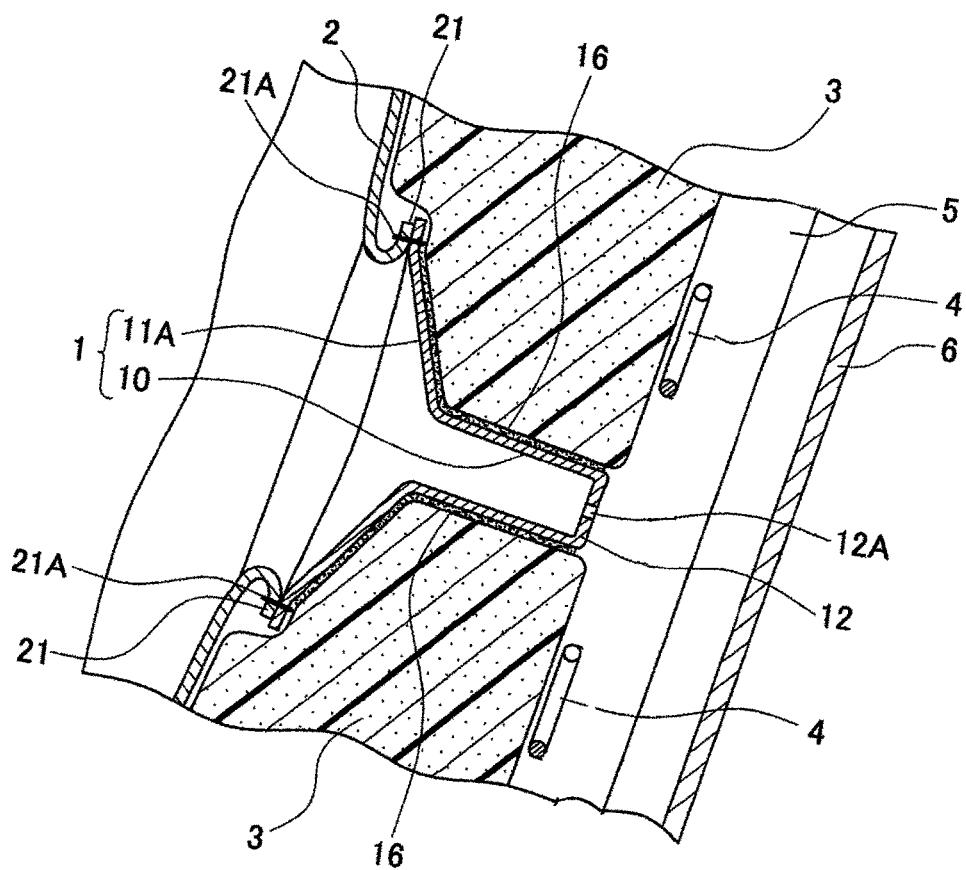

[FIG. 10]
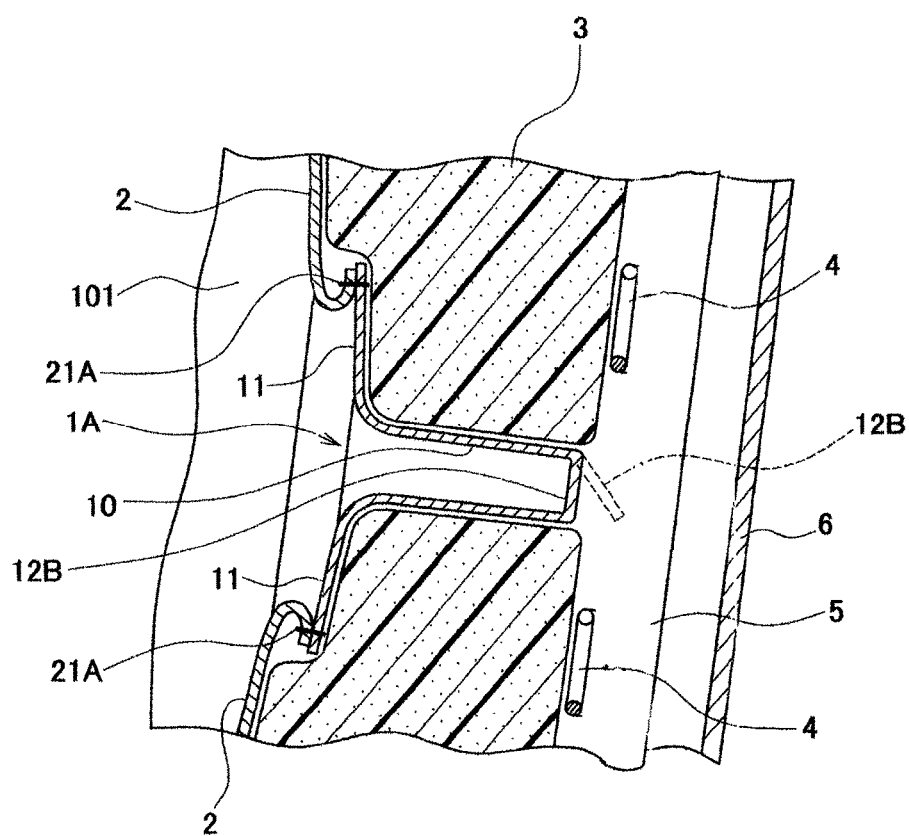

VEHICLE SEAT

CROSS REFERENCE TO RELATED APPLICATIONS

The present application is a 35 U.S.C. §371 National Phase conversion of PCT/JP2013/067721, filed Jun. 27, 2013, which claims benefit of Japanese Application No. 2012-146380, filed Jun. 29, 2012, the disclosure of which is incorporated herein by reference. The PCT International Application was published in the Japanese language.

TECHNICAL FIELD

The present invention relates to a seat for use with a vehicle, such as an automobile seat. In particular, the invention is directed to a seat, which has a functional element provided in a surface of the seat in such a manner that the functional element is partly exposed therein, wherein the functional element includes a ventilation element, a cup holder, and a container for containing small articles therein, for example.

BACKGROUND ART

Conventionally, among the seats of the abovementioned kind, as disclosed for example from the undermentioned patent-related document 1, there is known a seat having a lighting device provided therein as a functional element, such that the lighting device is partly exposed in an outer surface of the seat, Also, known from another patent-related document 2 mentioned below is a seat having a cup holder provided in a seat cushion thereof as a functional element, such that the cup holder is exposed in an outer surface of the seat. These functional elements exposed in an outer surface of the seat also function to improve a design and ornamental aspect of the seat.

PRIOR-ART LITERATURE

Patent-Related Documents

Patent-related Document 1: Japanese Laid-Open Patent Publication No. 2012-20668
Patent-related Document 2: Japanese Laid-Open Patent Publication No. 2007-118757

SUMMARY OF THE INVENTION

Problems to be Solved by the Present Invention

According to the foregoing conventional seats, the functional elements exposed in the outer surface of the seat are made of a rigid material including a hard synthetic resin material or a metallic material, with the objective of preventing deformation and breakage of the functional element which may occur due to load and pressure being applied thereto from a seat occupant sitting on the seat. However, the functional element of such hard material directly contacts the seat occupant sitting on the seat, which gives the seat part an objectionable touch.

It is therefore an object of the present invention to provide a vehicle seat which not only avoids the above-stated objectionable touch of a functional element, but also improves the external appearance of the seat for enhancement of design and ornamental aspects of the seat.

Means for Solving the Problem

In order to achieve the foregoing object, in accordance with the present invention, there is provided a vehicle seat including:
 a foam padding having a through-bore;
 a surface cover element covering a surface of the foam padding; and
 a functional element formed from a soft material, the functional element having:
 a tubular body fitted in the through-bore of the foam padding; and a flange integral with the tubular body,
 wherein an area of the flange of the functional element, adjacent to a peripheral end of the flange, is sewn with a reverse side of an edge portion of an opening defined in the surface cover element,
 wherein such reverse side faces toward the foam padding, and the surface cover element with the flange thus sewn therewith covers the foam padding, with the tubular body being fitted in the through-bore of the foam padding, so that a surface of the flange of the functional element is exposed at an outer surface of the vehicle seat.

In the above-described vehicle seat, since the functional element is formed from the soft material, the surface cover element may be sewn with the flange of the functional element. Hence, there is no need to secure any hard functional element made of a hard material to the outer surface of the seat, so that a seat occupant seat does not feel any objectionable touch and can enjoy comfortable seating on the seat. Further, since the flange of the functional element is exposed at the outer surface of the seat, the outer appearance of the seat can be aesthetically improved.

The functional element may be formed from an elastomer, in which case, the functional element can not only be formed in any desired shape, but also can be easily connected to the surface cover element.

The functional element may be formed as a ventilation element to permit ventilation of air in and from the seat.

The functional element may be secured by an adhesive to the foam padding. With this adhesive securement, the entire functional element can be precisely fixed against dislocation at a predetermined position in the foam padding, thereby preventing deformation of the functional element as well as removal of the same from the foam padding, even when a pressure or load is applied to the functional element from a seat occupant sitting on the seat.

In one embodiment, the vehicle seat may include a securement element for securing the functional element to the foam padding. The securement element comprises an anchor piece integral with the functional element, wherein the anchor piece is anchored to an inner surface of the foam padding, thereby anchoring and securing the functional element to the foam padding. In another embodiment, another securement element for securing the functional element to the foam padding may comprise: at least one through-hole formed in the foam padding; and at least one anchor pin inserted in the at least one through-hole and anchored to the inner surface of the foam padding, thereby anchoring and securing the functional element to the foam padding. Using either embodiment makes it possible to prevent both deformation of the functional element and its removal from the foam padding, even when a pressure or load is applied thereto from a seat occupant.

At least one support wire may be provided in the foam padding in an integral manner The functional element may have at least one clip fixedly provided to a reverse surface of the flange, which faces the foam padding. One or more clips may be engaged with one or more support wires. This embodiment makes, it possible to prevent both deformation of the functional element or its removal from the foam padding, even when a pressure or load is applied thereto from a seat occupant.

The flange may be formed in a radially-expanding and sloped fashion, such that the flange becomes divergent in a direction outwardly thereof. This arrangement avoids direct contact of a seat occupant's body portion with the flange, thereby reliably preventing deformation of the functional element and also permitting the functional element to fully perform its utility function, without being disturbed by the seat occupant's body portion.

In another embodiment, the vehicle seat includes a support surface on which a body portion of a seat occupant is to rest. The support surface has a center portion and a side support portion. The functional element is disposed between the center portion and the side support portion. This arrangement permits the functional element to be used as an anchoring element for neatly stretching the surface cover element on the foam padding and anchoring it to an inside of the seat.

In another embodiment of the support surface, the functional element is disposed at a location that avoids direct contact of the body portion of the seat occupant with the support surface. This arrangement makes it possible to prevent deformation of the functional element and also permits the functional element to fully perform its utilitarian function, without being disturbed by the seat occupant's body portion.

Preferably, the flange of the functional element may be accommodated in a recess formed in a surface of the foam padding. This arrangement avoids direct contact of a seat occupant's body portion with the flange, thereby preventing deformation of the functional element and also permitting that functional element to fully perform its utilitarian function, without being disturbed by the seat occupant's body portion.

The aforesaid recess formed in the foam padding may be substantially identical in shape to the flange of the functional element, as viewed in plan. This arrangement makes it possible to prevent creation of uneven spots in the surface of the surface cover element, thereby minimizing an objectionable touch to a seat occupant.

The tubular body of the functional element has one side facing a front surface of the functional element and another side facing opposite the front side. Such another side may be provided with a shielding portion having an opening, preventing the inside of the seat from being viewed through the tubular body of the functional element. Hence, it is possible to preclude degradation of aesthetic quality of the outer appearance of the seat.

Preferably, the shielding portion may be formed with a plurality of openings. With this arrangement, when an object of a size larger than a diameter of each of the openings falls into the functional element, it is received by the shield portion and thus prevented from falling through the tubular body of the functional element into the inside of the seat.

The aforesaid shielding portion may be provided with a blocking element operable to open and close the functional element. This arrangement permits a flow of air to be blocked by such element when ventilation is not required.

Effects of the Invention

Therefore, the vehicle seat of the present invention not only makes it possible for a seat occupant to enjoy a comfortable seating thereon, without feeling any objectionable touch, but also prevents the functional element from being deformed by the seat occupant sitting on the seat, while permitting the functional element to fully perform its utilitarian function, without being disturbed by the seat occupant. In addition, a design value of the vehicle seat can be improved.

BRIEF DESCRIPTION OF THE DRAWINGS

FIG. 1: A perspective view of a vehicle seat in accordance with the present invention.

FIG. 2: A fragmentary sectional view taken along the line II-II in the FIG. 1.

FIG. 3: A partly-broken perspective view showing a principal part of the present invention.

FIG. 4: A partly-broken perspective view showing the principal part of the present invention, as viewed from the reverse side thereof.

FIG. 5: A fragmentary sectional view showing a second exemplary embodiment wherein a functional element in the present invention is secured to a foam padding.

FIG. 6: A fragmentary sectional view showing a third exemplary embodiment wherein the functional element in the present invention is secured to the foam padding.

FIG. 7: A fragmentary sectional view showing a fourth exemplary embodiment wherein the functional element in the present invention is secured to the foam padding.

FIG. 8: A fragmentary sectional view showing a fifth exemplary embodiment wherein the functional element in the present invention is secured to the foam padding.

FIG. 9: A fragmentary sectional view showing another exemplary embodiment of a flange of the functional element in accordance with the present invention.

FIG. 10: A fragmentary sectional view showing another exemplary embodiment of the functional element in accordance with the present invention.

MODE FOR CARRYING OUT THE INVENTION

Hereinafter, with reference to the drawings, a specific description will be made of a vehicle seat in accordance with the present invention.

FIG. 1 indicates one exemplary embodiment of the present invention as applied to a vehicle seat provided with at least one ventilation element. In FIG. 1, an illustrated vehicle seat (or automotive seat) comprises: a seat back SB having a forwardly-facing support surface supporting a back portion of a seat occupant; and a seat cushion SC having an upwardly-facing support surface for supporting thigh and buttock portions of the seat occupant. In each of those two support surfaces respectively of the seat back SB and seat cushion SC, there is a functional element 1 configured to provide the seat with an ornamental appearance and a required operative function (embodied by a ventilation duct function as shown in the Figures). Outer surfaces of the seat back SB and outer surfaces of the seat cushion SC are each covered with a surface cover element 2. The functional element 1 is secured by sewing each of the two surface cover elements 2 to the seat back SB and to seat cushion SC, respectively.

The forwardly-facing support surface of the seat back SB has: a center support portion 100 and a pair of left and right side bolster support portions 101 and 101. In the center support portion 100, the above-defined functional element 1 for the seat back is arranged so as to have: a transversely extending portion disposed at a location corresponding to a neck of a seat occupant who is to sit on the seat and two portions which extend close to and alongside of the left and right side bolster support portions 101 and 101 of the seat back, respectively. This arrangement avoids direct contact of the functional element 1 with an upper body portion of the seat occupant who is to sit on the seat, not only preventing the functional element 1 from being deformed by the seat occupant, but also allowing, the functional element 1 to fully perform its utilitarian function of ventilation, without being disturbed by the seat occupant.

Also, the upwardly-facing support surface of the seat cushion SC has a center support portion 100 and a pair of left and right side bolster support portions 101 and 101 in a manner similar to the seat back SB stated above. In the center support portion 100 of this seat cushion SC, the above-defined functional element 1 for the seat cushion is arranged so as to have: two portions which extend close to and alongside of the left and right side support bolster portions 101 and 101 of the seat cushion SC, respectively and a transversely extending portion disposed between a thigh support region and a buttock support region in the center support portion 100, wherein the thigh support region is a region on which a thigh portion of the seat occupant is to be supported, and wherein the buttock support region is a region on which a buttock portion of the seat occupant is to be supported. This arrangement avoids direct contact of the functional element 1 with the thigh and buttock portions of the seat occupant, and therefore, it is to be seen that the functional element 1 is situated at positions to which no load is applied from the seat occupant who sits on the seat.

Moreover, with the above-described arrangement, the functional element 1 for the seat back can be used as an anchoring element for anchoring and securing the corresponding areas of the surface cover element 2 to the seat back, whereas the functional element 1 for the seat cushion can also be used as an anchoring element for anchoring and securing the corresponding areas of the surface cover element 2 to the seat cushion. Therefore, the surface cover element 2 can be anchored and attached by the functional element 1 to each of the seat back and seat cushion, with high efficiency. This eliminates the necessity of using any other additional anchoring element.

The foregoing functional element 1 also functions to perform ventilation of air in the seat. That is, a plurality of hole regions A are formed in the functional element 1 in an equidistant manner, such that each of the hole regions A communicates with the inside of the seat to allow flow of air therethrough. Those hole regions A are prevented from being closed by a seat occupant, due to the above-described arrangement of the functional element 1 in each of the support portions 100 and 101 of the seat back SB and seat cushion SC, respectively.

As shown, all exposed outer portions of the functional elements 1, exposed from the forwardly-facing surface of seat back and the upwardly-facing surface of the seat back, are each elongated in the longitudinal direction thereof and are small in width. Hence, such exposed narrow portions of the functional element are so situated as to be free of contact with the seat occupant's body portions that are to be rested on the seat cushion and seat back, thereby precluding direct exertion of the seat occupant's weight or loads on the exposed outer portions of the functional elements, so that deformation of the exposed outer portions is prevented. The functional element 1 is formed from an olefin elastomer, but, this is not limited. For instance, the functional element 1 may be formed from a thermoplastic elastomer or any other synthetic resin material having a rubber-like elasticity. Use of such elastomer permits the functional element itself to be formed in any desired shape smoothly and also permits easy connection of the functional element to the seat.

Alternatively, the functional element 1 may be formed from a non-woven cloth having a certain elasticity and rigidity enough to retain its original shape normally, which can be sewn to the surface cover element 2. In this case, for example, a forming method disclosed in Japanese Laid-Open Utility Model Publication Hei 7-15448 may be employed. As taught in this publication, a base material of polyester fibers may be impregnated with an SB resin material. Thereafter, the thus-impregnated base material may be subjected to a heating and press-working process so as to form a non-woven cloth functional element comprising: a tubular body 10 as a utility functional portion thereof; and a flange 11. Of course, this non-woven cloth functional element can achieve the same effects as stated above for the elastomer functional element.

FIGS. 2 to 4 show a first embodiment of the present invention. A functional element 1 shown in those Figures is adapted for use with a ventilated seat or the like, and is provided in the aforesaid support surface portions of the seat back SB and seat cushion SC. In the present embodiment, the functional elements 1 are each provided with air blowing holes as a utility function for air ventilation. In particular, the functional element 1 for the seat back constitutes air blowing holes through which air may be discharged outwardly from the inside of the seat back, whereas the functional element 1 for the seat cushion constitutes air blowing holes through which air may be discharged outwardly from the inside of the seat cushion. As shown in FIGS. 2 and 3, each of the functional elements comprises: a tubular body 10; and a flange 11 integral with the tubular body 10.

The tubular body 10 of the functional element is inserted and secured in a through-bore 30 formed in a foam padding 3 covered with a surface cover element 2. One end of the tubular body is formed with the aforesaid flange 11. The other end of the tubular body is formed with and closed by a shield portion 12, which has a plurality of apertures 12A formed therein. This shielding formation prevents the insides of the seat cushion and seat back from being viewed through the hole region 1A of the tubular body. Also, the formation of the apertures 12A in the shield portion 12 of the functional element 1 is advantageous in that, when an article or thing of a size larger than a diameter of each of the apertures 12A falls into the hole region of the functional element, it is received by the shield portion and thus prevented from falling through the tubular body 10 of the functional element 1 into the inside of the seat back or seat cushion.

The illustrative tubular body 10 described above is formed substantially in a shape of an elongated ellipse in cross-section. This is however not limiting, but it is possible to form the tubular body 10 in any other proper shape. For example, the tubular body may be formed to have a circular cross-section, a square cross-section, or an oblong cross-section.

The aforementioned flange 11 of the functional element is disposed on the outer surfaces of the seat cushion and seat back which overlie the outer surface 3A of the padding 3. Further, arrayed in that flange 11 are a plurality of the aforesaid tubular bodies 10, 10, . . . in a spaced-apart relation with one another. Each of the tubular bodies 10 has the aforesaid hole region 1A, and therefore each tubular body 10 is opened on the side of the flange 11 thereof.

The surface cover element 2 is sewn, by use of a sewing machine, to and along the peripheral end portions of the above-described flange 11, such that all localized regions of the flange 11 near to the peripheral end portions thereof are sewn with the surface cover element 2. Specifically, as can be seen in FIGS. 2 to 4, the surface cover element 2 is formed with an opening 20 which permits the flange 11 to be sewn with the surface cover element 2 therethrough, and all edge portions of that opening 20 are folded over inwardly to underlie a reverse side of the surface cover element 2. All the thus-folded edge portions of the opening are sewn with the peripheral end portion of the flange 11 by the sewing machine, using a sewing thread 21A. On the other hand, the padding 3 is formed with a recess 33. Received in that recess 33 are the flange 11 and the above-described sewn portions where the folded edge portions of the surface cover element 2 has been sewn with the flange 11, so that those sewn portions of the surface cover element 2 and flange 11 do not project outwardly from outer surfaces of the seat.

The recess 33 of the padding is formed in a shape substantially equal to a contour of the flange 11, as viewed in plan. The flange 11 is accommodated in the recess 33 such that the outer surfaces of the padding and flange are substantially flush with each other, thereby precluding creation of uneven spots in the surfaces of the seat. With this arrangement, it is possible to minimize an objectionable touch of the flange to a seat occupant sitting on the seat.

As shown in FIG. 2, the inward surface 3B of the padding 3 is supported by a support element such as springs 4 which are extended between frame portions of a frame 5. As far as the seat back SB is concerned, a rear surface of the seat back SB is supported by the frame 5 and springs 4, and those frame and springs are covered with a covering element, such as a surface cover element 6 provided to that rear surface of the seat back.

Accordingly, in assembly, when the padding 3 is covered with the surface cover element 2 that has been sewn with the functional element 1 as above, the tubular body 10 of the functional element is inserted and fitted in the through-bore 30 of the padding 3. Then, the tubular body 10 as well as the flange 11 are fixedly secured to the padding 3 by means of an adhesive 16. With this adhesive banding, both tubular body 10 and flange 11 are prevented from being deformed and also prevented from being removed from the padding 3. Further, the flange 11 is exposed to the surfaces of the seat cushion and seat back, and air may be sent through the hole regions 1A and discharged therefrom by means of a ventilation device or other proper device provided in each of the seat cushion and seat back.

Preferably, with regard to the flange 11 of the functional element 1, a decorative resin film (made of polyester, for example) may be laminated thereon integrally, during the steps of forming the flange 11 with the functional element. This provides a value of design to an outer appearance of the flange exposed from the outer surfaces of the seat, and also reinforces the flange to increase its elasticity and rigidity for retaining the original shape thereof.

FIG. 5 shows a second exemplary embodiment, which differs from the above-described first exemplary embodiment for securing the functional element to the padding. In the present second embodiment, an anchor place 13 is formed in the tubular body 10 of the functional element 1, instead of the adhesive 16 used in the preceding first mode. In particular, the functional element 1 is secured to the padding 3 by attaching the anchor piece 13 to the inner surface 3B of the padding 3. Thus, securing the functional element 1 to the padding 13 can be easily done by forcibly inserting the anchor piece through the through-bore of the padding, which expedites the securing process more efficiently than in the adhesive securing process using the adhesive 16.

FIG. 6 shows a third exemplary embodiment wherein the functional element is secured to the padding. In the present embodiment, it is to be understood that a plurality of securing through-holes are formed in the padding 3 so as to surround the aforesaid through-bore 30 and they are open at each of the front and rear surfaces of the padding. Further, a plurality of arrow-like anchor pins 14 of a hard synthetic resin material are integrally fixed to a reverse surface of the flange 11 of the functional element, wherein the reverse surface of the flange faces to a side where the tubular body of the functional element lies. In brief, inserting such anchor pins 14 through the aforesaid securing through-holes, respectively, results in the functional element 1 being securely attached in the padding 3. Therefore, when the tubular body 10 of the functional element 1 is inserted into the through-bore 30 of the padding 3, the anchor pins 14 are also automatically inserted in the securing through-holes, respectively. As a result, the arrow-like or conical heads of the anchor pins project from the inner surface of the padding and are anchored and contacted thereupon, whereby the functional element is securely retained in the padding against removal therefrom. Therefore, it is possible to smoothly and stably secure the functional element 1 to the padding 3, and in particular, the securing pins 14 effectively reinforce the flange 11 to increase a rigidity of that flange 10 against deformation.

FIG. 7 shows a fourth exemplary embodiment wherein the functional element is secured to the padding. According thereto, a securing hole 31 is formed as a radial extension of the through-bore 30 by cutting an inner surface of that through-bore 30 radially. Further, the functional element in this embodiment has a cylindrical securing plate 14A fixed to a reverse side of the flange 11 thereof, wherein the reverse surface of the flange faces to a side where the tubular body of the functional element lies. In the present embodiment, securing the functional element 1 to the padding 3 comprises the steps of: inserting the securing plate 14A in the securing hole 31, such that an outer circumferential surface of that securing plate 14A closely contacts an inner surface of the securing hole 31; and thereafter securely connecting a free end of the securing plate 14A to an inward surface region 3B of the padding 3 or a spring 4 which supports the padding 3.

Accordingly, the securing hole 31 is formed by simply increasing the diameter of the through-bore 30 of the padding 3, thereby eliminating the necessity of forming the securing hole 31 independently of the through-bore 30 in the padding 3. This arrangement realizes easy and rapid formation of the padding 3.

FIG. 8 shows a fifth exemplary embodiment wherein the functional element is secured to the padding. This mode suggests an arrangement for positively securing and retaining the functional element 1 to the padding 3 against removal from the latter 3. In particular, substantially V-shaped clips 15, each having resiliently-closed two free ends, are fixed at the two base ends thereof to a reverse side of the flange 11 of the functional element, wherein the reverse surface of the flange faces to a side where the tubular body of the functional element lies. In the present mode, securing the functional element 1 to the padding 3 is done by engaging the two free ends of each of the V-shaped clips 15 with each of support wires 15A provided in the padding 13. With this arrangement, even when the functional element receives pressure from a seat occupant, the V-shaped clips act to not only prevent deformation of the functional element, but also to prevent removal of the functional element from the padding. In this context, as shown, the padding 3 includes a space accommodating the V-shaped clips 15 therein.

As another exemplary embodiment shown in FIG. 9, the functional element 1 may be formed with a bell-mouth flange 11A having a radially-expanding sloped surface which becomes divergent outwardly from the hole region of the functional element. Therefore, when securing the functional element 1 to the padding 3, the flange 11A is driven or sunk into the elastic padding 3 to the extent that a whole of the flange is recessed inwardly of that padding.

This arrangement avoids direct contact of a seat occupant's body portion with the flange 11A, which completely prevents deformation of the functional element 1 and also permits that functional element to perform its utilitarian function of air ventilation, without being disturbed by the seat occupant's body portion.

Note that the functional element 1 as well as the flange 11A are fixed to the padding 3 by the adhesive 16, similarly to the preceding first exemplary embodiment.

As still another exemplary embodiment shown in FIG. 10, the shielding portion 12 provided in each of the preceding embodiments, as seen in all the preceding Figures, may be replaced by a device 12B operable to open and close the end of the functional element. The device 12 includes a valve or a cock, for instance. In this mode, such device 12B can be operated to open the end of the functional element when ventilation is required, but, when no ventilation is required, the device 12B can be operated to close the end of the functional element.

While having described the present invention thus far, it should be understood that the invention is not limited to the above-described configurations of functional element 1, but, within the scopes of the present invention, the functional elements may be optionally formed as: a storage container element including a cup holder or a container in which some small articles may be stored; a housing for accommodating an electric equipment such as a at least one speaker; or an ornamental plate (escutcheon), for example.

DESCRIPTION OF THE REFERENCE NUMERALS 1 denotes a functional element.
2 denotes a surface cover element.
3 denotes a foam padding.
10 denotes a tubular body of the functional element.
11 and 11A denote two different flanges of the functional element, respectively.
12 denotes a shielding portion.
12A denotes an opening of the shielding portion.
13 denotes an anchor piece.
14 denotes a securing pin.
15 denotes a clip.
15A denotes a support wire.
16 denotes an adhesive.
20 denotes an opening formed in the surface cover element,
30 denotes a through-bore formed in the padding.
33 denotes a recession.
100 denotes a central support portion defined in a support surface on which a body portion of a seat occupant is to rest.
101 denotes a side bolster portion defined in s support surface on which a body portion of the seat occupant is to rest.

The invention claimed is:

1. A vehicle seat comprising:
   a support side for receiving a body portion of a seat occupant;
   a foam padding having a through-bore formed therein, said through-bore being open at a side corresponding to said support side;
   a surface cover element covering a surface of said foam padding and having an opening defined therein, said opening having an end portion that has a reverse side facing said surface of said foam padding;
   said surface cover element including a surface region defined at a side corresponding to said support side;
   said opening being defined in said surface region of said surface cover element; and
   a functional element formed from a soft material, said functional element comprising:
   a tubular body fitted in said through-bore of said foam padding;
   said tubular body having: a first open side, and a second side opposite to said first open side, said second side including a shielding portion and an opening element arranged in said shielding portion, and
   a flange provided integrally with said first open side of said tubular body,
   wherein an area of said flange of said functional element, adjacent to a peripheral end of the flange, is sewn with said reverse side of the end portion of the opening defined in said surface cover element, so that a sewn portion created thereby underlies said end portion and is free of having a portion that projects outward from said support side of said vehicle seat,
   wherein said surface cover element with said flange thus sewn therewith covers said foam padding, with said tubular body being fitted in said through-bore of said foam padding, so that a surface of said flange of said functional element, surrounded by said end portion of said opening, is positioned below said surface region of said cover element, thereby avoiding or minimizing direct contact of the thus-surrounded surface of the flange and said first open side of said tubular body with said body portion of said seat occupant, and further, said surrounded surface as well as said first open side are exposed at said support side of said vehicle seat through said opening, and
   wherein said functional element is arranged on the support side of the vehicle seat at a location that avoids direct contact of the functional element with said body portion of said seat occupant.

2. A vehicle seat as described in claim 1, wherein said functional element is formed from an elastomer.

3. A vehicle seat as described in claim 1, wherein said functional element is formed as a ventilation element.

4. A vehicle seat as described in claim 1, wherein said functional element is secured by an adhesive to said foam padding.

5. A vehicle seat as described in claim 1, wherein the vehicle seat includes an anchoring element positioned and configured to secure said functional element to said foam padding, said anchoring element comprising an anchor piece integral with said functional element,
   wherein said anchor piece is anchored to an inward surface of said foam padding, thereby anchoring the functional element to the foam padding.

6. A vehicle seat as described in claim 1, further comprising:

at least one support wire provided integrally in said foam padding, and said functional element comprises at least one clip fixedly provided to a reverse surface of said flange which faces said foam padding,
wherein said at least one clip is engaged with said at least one support wire.

7. A vehicle seat as described in claim 1, wherein said flange is formed in a radially-expanding and sloped fashion, such that the flange becomes divergent in a direction outwardly thereof.

8. A vehicle seat as claimed in claim 1, wherein said support side comprises a center portion of said vehicle seat and a side support portion of said vehicle seat, and
wherein said functional element is disposed between said center portion and said side support portion.

9. A vehicle seat according to claim 1, wherein said flange of said functional element is accommodated in a recess which is formed in said surface of said foam padding so as to surround said through-bore of the foam padding.

10. A vehicle seat as described in claim 1, wherein the vehicle seat further comprises:
a securing element positioned and configured to secure said functional element to said foam padding, said securing element comprising:
at least one through-hole formed in the foam padding; and
at least one anchor pin inserted in said at least one through-hole and anchored to an inward surface of the foam padding, thereby securing the functional element to the foam padding.

11. A vehicle seat according to claim 1, further comprising a seat back,
said seat back comprising:
said foam padding provided in the seat back; and
a support surface portion corresponding to said support side, said support surface portion being positioned and configured to receive an upper body portion of said seat occupant;
wherein said sewn portion is free of having a portion that projects outward from said support surface portion of said seat back,
wherein said surface cover element with said flange thus sewn therewith covers said foam padding, with said tubular body being fitted in said through-bore of said foam padding, so that said surface of said flange of said functional element, surrounded by said end portion of said opening, is positioned below said surface region of said surface cover element, thereby avoiding or minimizing direct contact of the thus-surrounded surface of the flange and said first open side of the tubular body with said upper body portion of said seat occupant, and further, said surrounded surface as well as said first open side are exposed at said support surface portion of said seat back through said opening, and
wherein said functional element is arranged on the support surface portion of the seat back at a location that avoids direct contact of the functional element with said upper body portion of said seat occupant.

12. A vehicle seat according to claim 11, wherein said functional element is arranged in a vertical direction of said seat back at a first location avoiding direct contact of the functional element with said upper body portion and also arranged in a traverse direction intersecting said vertical direction at a second location avoiding direct contact of the functional element with said upper body portion.

13. A vehicle seat according to claim 1, further comprising a seat cushion,
said seat cushion comprising:
said foam padding provided in the seat cushion, and
a support surface portion corresponding to said support side, said support surface portion being positioned and configured to receive a lower body portion of said seat occupant;
wherein said sewn portion is free of having a portion that projects outward from said support surface portion of said seat back,
wherein said surface cover element with said flange thus sewn therewith covers said foam padding, with said tubular body being fitted in said through-bore of said foam padding, so that said surface of said flange of said functional element, surrounded by said end portion of said opening, is positioned below said surface region of said surface cover element, thereby avoiding or minimizing direct contact of the thus-surrounded surface of the flange and said first open side of the tubular body with said lower body portion of said seat occupant, and further, said surrounded surface as well as said first open side are exposed at said support surface portion of said seat cushion through said opening, and
wherein said functional element is arranged on the support surface portion of the seat cushion at a location that avoids direct contact of the functional element with said lower body portion of said seat occupant.

14. A vehicle seat according to claim 13, wherein said functional element is arranged in forward and rearward directions of said seat cushion at a first location avoiding direct contact of the functional element with said lower body portion as well as in a traverse direction intersecting said forward and rearward directions at a second location avoiding direct contact of the functional element with the lower body portion.

15. A vehicle seat according to claim 1, wherein said flange of said functional element extends from said tubular body, substantially on a horizontal plane, hence providing a substantially horizontally extending flange at the tubular body, and
wherein said recession formed in said foam padding is substantially identical in shape to said substantially horizontally extending flange of said functional element.

16. A vehicle seat according to claim 1, wherein said second side of said tubular body is disposed within said foam padding, and wherein said opening element comprises an opening.

17. A vehicle seat according to claim 1, wherein said second side of said tubular body is disposed within said foam padding, and
wherein said opening element comprises a plurality of openings.

18. A vehicle seat according to claim 1, wherein said second side of said tubular body is disposed within said foam padding, and
wherein said shielding portion includes an obscuring element operable to open and close said opening element.

19. A vehicle seat comprising:
a support side for receiving a body portion of a seat occupant;
a foam padding having a through-bore formed therein, said through-bore being open at a side corresponding to said support side;
a surface cover element covering said surface of said foam padding and having an opening defined therein, said opening having an end portion which has a reverse side facing said surface of said foam padding;

said surface cover element including a surface region defined at a side corresponding to said support side;

said opening being defined in said surface region of said surface cover element;

said end portion of said opening being folded over inwardly toward said reverse side of said particular end portion, thereby providing a folded edge portion to the opening; and a functional element formed from a soft material, said functional element comprising:

a tubular body fitted in said through-bore of said foam padding:

said tubular body having: a first open side, and a second side opposite to said first open side, said second side including a shielding portion and an opening element arranged in said shielding portion, and a flange provided integrally with said first open side of said tubular body, wherein an area of said flange of said functional element, adjacent to a peripheral end of the flange, is sewn with said folded over portion of said end portion of said opening defined in said surface cover element, so that a sewn portion created in and along said folded over portion underlies said end portion and is free of having a portion that projects outward from said support side of said vehicle seat, wherein said surface cover element with said flange thus sewn therewith covers said foam padding, with said tubular body being fitted in said through-bore of said foam padding, so that a surface of said flange of said functional element, surrounded by said folded over portion, is positioned below said surface region of said surface cover element, thereby avoiding or minimizing direct contact of the thus-surrounded surface of the flange and said first open side of the tubular body with said body portion of said seat occupant, and further, said surrounded surface as well as said first open side are exposed at said support side of said vehicle seat through said opening, and wherein said functional element is arranged on the support side of the vehicle seat at a location that avoids direct contact of the functional element with said body portion of said seat occupant.

* * * * *